United States Patent
Tavares et al.

(10) Patent No.: US 12,175,544 B2
(45) Date of Patent: Dec. 24, 2024

(54) ONLINE INFORMATION VALIDATION

(71) Applicant: ADP, INC., Roseland, NJ (US)

(72) Inventors: Jose Tavares, Porto Alegre (BR);
Guilherme Abbott, Porto Alegre (BR);
Andres Mello, Porto Alegre (BR)

(73) Assignee: ADP, Inc., Roseland, NJ (US)

( * ) Notice: Subject to any disclaimer, the term of this patent is extended or adjusted under 35 U.S.C. 154(b) by 116 days.

(21) Appl. No.: 16/875,772

(22) Filed: May 15, 2020

(65) Prior Publication Data

US 2021/0358054 A1 Nov. 18, 2021

(51) Int. Cl.
| | | |
|---|---|---|
| G06Q 10/10 | (2023.01) | |
| G06F 40/205 | (2020.01) | |
| G06Q 10/06 | (2023.01) | |
| G06Q 30/02 | (2023.01) | |
| G06Q 40/12 | (2023.01) | |
| G06Q 50/00 | (2012.01) | |
| G06Q 99/00 | (2006.01) | |

(52) U.S. Cl.
CPC .......... G06Q 50/01 (2013.01); G06F 40/205 (2020.01); G06Q 40/125 (2013.12)

(58) Field of Classification Search
CPC .... G06Q 50/01; G06Q 40/125; G06F 40/205; G06F 40/169; G06F 40/226; G06F 40/30
USPC .................................. 705/1.1–912
See application file for complete search history.

(56) References Cited

U.S. PATENT DOCUMENTS

| | | | | | |
|---|---|---|---|---|---|
| 6,801,224 | B1 * | 10/2004 | Lewallen | .................. | G06F 8/38 715/788 |
| 8,504,559 | B1 * | 8/2013 | Elman | ................... | H04L 67/306 705/321 |
| 8,533,110 | B2 * | 9/2013 | Kremen | ................. | G06Q 40/06 705/320 |
| 8,595,148 | B1 * | 11/2013 | Borgen | ................ | G06Q 10/105 705/321 |
| 8,892,687 | B1 * | 11/2014 | Call | ..................... | H04L 63/1466 707/E17.014 |
| 2003/0078908 | A1 * | 4/2003 | Paransky | ............. | G06Q 10/107 |
| 2013/0339220 | A1 * | 12/2013 | Kremen | ................. | G06Q 50/01 705/38 |

(Continued)

OTHER PUBLICATIONS

Orellana García, Gonzalo Antonio. "Implementation of Digital Badges for the Multicultural Association of Porvoo." (2017) (Year: 2017).*

*Primary Examiner* — Jonathan P Ouellette
(74) *Attorney, Agent, or Firm* — Foley & Lardner LLP

(57) ABSTRACT

A method, apparatus, system, and computer program product provide visual verification of electronic data. A computer system accesses an electronic document. The computer system parses the electronic document to identify an assertion about a person. The computer system identifies an organization that maintains records capable of sustaining the assertion. The computer system sends a request to the organization to search for information about the person that substantiates the assertion. In response to receiving a reply that substantiates the assertion, the computer system generates a verification badge in the context of the organization. The computer system transforms the electronic document to display a verified document that associates the verification badge with the assertion. The computer system displays the verified document, including the verification badge in association with the assertion.

20 Claims, 6 Drawing Sheets

(56) References Cited

U.S. PATENT DOCUMENTS

| | | | |
|---|---|---|---|
| 2014/0353369 A1* | 12/2014 | Malin | G06K 19/06037 |
| | | | 707/769 |
| 2017/0024700 A1* | 1/2017 | Shahulhameed | G06Q 10/1053 |
| 2018/0262591 A1* | 9/2018 | Jugovic | H04L 12/14 |
| 2020/0007336 A1* | 1/2020 | Wengel | G06F 16/1824 |

* cited by examiner

ONLINE INFORMATION VALIDATION

BACKGROUND INFORMATION

1. Field

The present disclosure relates generally to an improved system and method, which can be embodied in an apparatus, computer system, or computer program product, for providing visual verification of electronic data.

2. Background

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance, wellness plans, and other programs and organizations using an employee information system. As yet another example, an information system may be used to determine when to hire new employees, assign employees to projects, perform reviews for employees, and other suitable operations for the organization. As another example, a research department in the organization may use an information system to store and analyze information to research new products, perform reviews of employees, hire new employees, analyze products, or for other suitable operations.

Currently used information systems include databases. These databases store information about the organization. For example, these databases store information about employees, products, research, product analysis, business plans, and other information about the organization.

The information systems may be used in performing operations for an organization. The operations may include hiring operations and project assignments.

For example, in filling a position in an organization, requirements for the position are identified as part of the process. The position may be filled from within the organization or by hiring someone from outside of the organization.

As another example, in assigning people to projects, various characteristics about the people may be used to identify who is most suited for different projects. The characteristics may include, for example, skills and experience that may be considered to identify people with the skills needed for a project.

A search in one or more databases in one or more information systems may be made to identify information about characteristics for people who may be suitable for a particular project. The search may return performance reviews, prior project assignments, emails, publications, tenure at the organization, and other information about people in the organization that may be used to identify who may be assigned to a project.

In filling a position, skills that are desired for the position may be identified from searching one or more information systems. Searching one or more information systems may identify information about characteristics that may be desirable for the position. For example, information about skills for people in the same or similar positions may be reviewed, as well as skills and experience of those people garnered from their previous experiences and.

As part of identifying prospective candidates to fill a position, information systems including online profiles of the candidates may also be searched. However, because these profiles are created by the people themselves, organizations lack the resources to quickly determine the truthfulness of assertions made in these profiles by prospective candidates. An organization may use a third-party search firm to verify aspects of the profile, these searches represent an additional expense to the organization, and are therefore not to be performed as part of a first pass of the candidates. The results of a search for prospective candidates may be inaccurate, unverifiable, and more time-consuming than desired.

Therefore, it would be desirable to have a method and apparatus that take into account at least some of the issues discussed above, as well as other possible issues. For example, it would be desirable to have a method and apparatus that overcome a technical problem of verifying employment history asserted in an online profile that make identifying qualified people more cumbersome and time-consuming than desired.

SUMMARY

An embodiment of the present disclosure provides a data verification system comprising a computer system and a document verifier in the computer system. The data verification system operates to access an electronic document. The data verification system operates to parse the electronic document to identify an assertion about a person. The data verification system operates to identify an organization that maintains records capable of sustaining the assertion. The data verification system operates to send a request to the organization to search for information about the person that substantiates the assertion. In response to receiving a reply that substantiates the assertion, the data verification system operates to generate a verification badge in the context of the organization. The data verification system operates to transform the electronic document to display a verified document that associates the verification badge with the assertion. The data verification system operates to display the verified document, including the verification badge in association with the assertion.

Another embodiment of the present disclosure provides a method for providing visual verification of electronic data. A computer system accesses an electronic document. The computer system parses the electronic document to identify an assertion about a person. The computer system identifies an organization that maintains records capable of sustaining the assertion. The computer system sends a request to the organization to search for information about the person that substantiates the assertion. In response to receiving a reply that substantiates the assertion, the computer system generates a verification badge in the context of the organization. The computer system transforms the electronic document to display a verified document that associates the verification badge with the assertion. The computer system displays the verified document, including the verification badge in association with the assertion.

Still another embodiment of the present disclosure provides a computer program product for providing visual verification of electronic data, the computer program product comprising a computer readable storage media with program code stored on the computer-readable storage media. The program code includes instructions for accessing an electronic document. The program code includes instructions for parsing the electronic document to identify an assertion about a person. The program code includes instructions for identifying an organization that maintains records capable of substantiating the assertion. The program code includes instructions for sending a request to the organization to search for information about the person that substantiates the assertion. The program code includes instructions for generating a verification badge in the context of the organization in response to receiving a reply that substantiates the assertion. The program code includes instructions for transforming the electronic document to display the verification badge in association with the assertion. The program code includes instructions for displaying the verified document, including the verification badge in association with the assertion.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that people often store information in electronic documents as part of an online social networking profile. The illustrative embodiments also recognize and take into account that verifying the truthfulness of assertions made in online profiles may be more cumbersome and time-consuming than desirable.

Thus, the illustrative embodiments provide a method, apparatus, and computer program product for graphically displaying verified employment data as part of a user's online profile. The employment verification system includes techniques that facilitate identifying and displaying employment verification information dynamically generated from trusted data sources. Employment verification techniques of the activity-based connection system may be applied to a wide variety of data types that may be gathered from a plurality of data sources existing across disparate devices, networks and in the cloud.

In this manner, graphically displaying verified employment data as part of a user's online profile can be made more easily as compared to currently used techniques. The employment verification system includes techniques that facilitate identifying and displaying employment verification information dynamically generated from trusted data sources. As a result, organizations can quickly determine the truthfulness of assertions made by prospective candidates in online profiles. The organization's search results for qualified candidates are therefore more accurate, more trustworthy, and less time-consuming as compared to currently used techniques.

Figure 1:
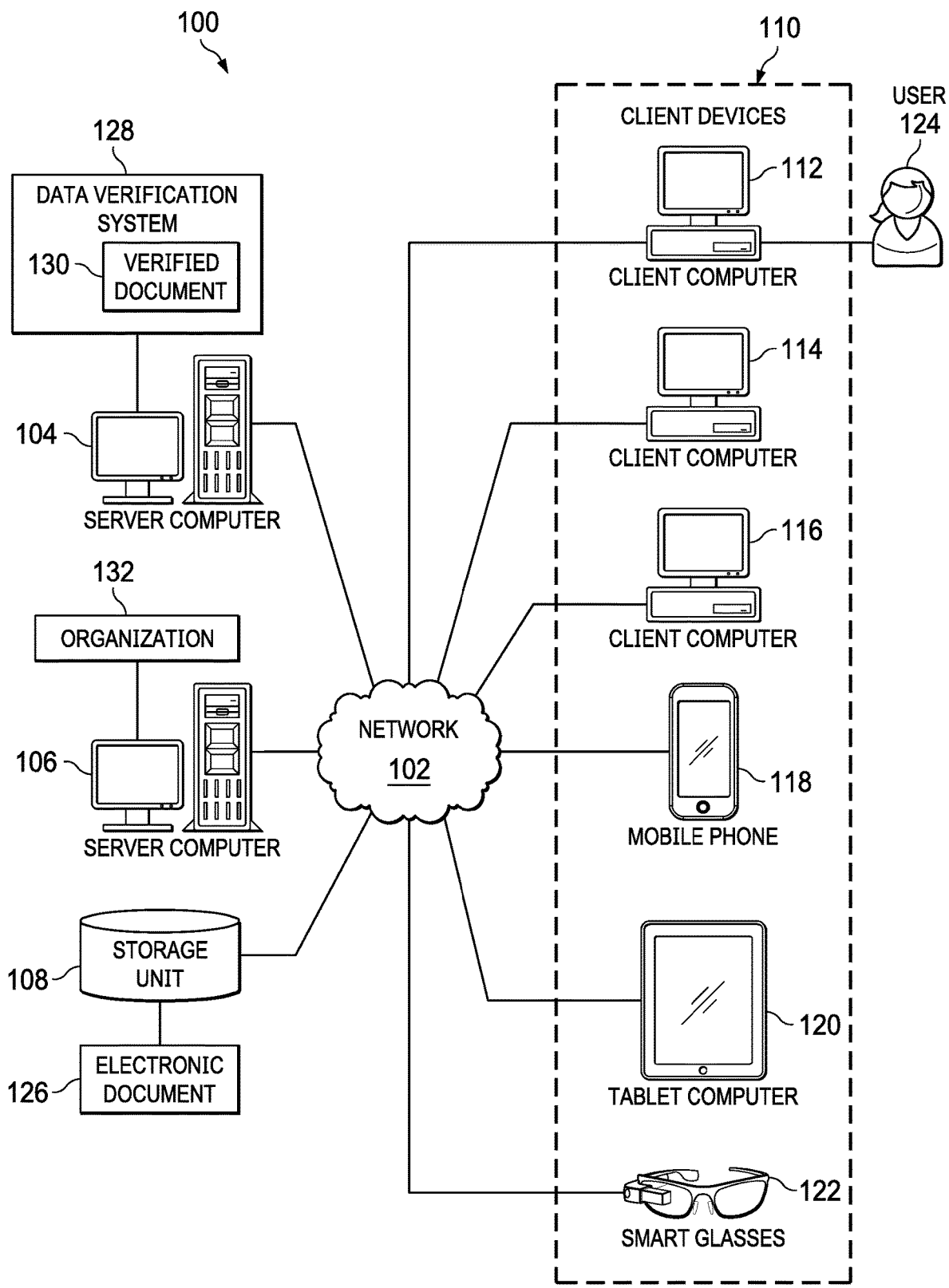
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, user 124 at client computer 112 can access and electronic document 126 on server computer 104. Data verification system 128 can identify an unsubstantiated assertion within electronic document 126 and forward the assertion to server computer 106 for verification. In response to receiving a reply that substantiates the assertion, data verification system 128 transforms the document into a verified document that includes a visual verification of the assertion.

In this illustrative example, data verification system 128 is located in server computer 104. As depicted, data verification system 128 operates in data verification system 128 to provide visual verification of electronic data asserted in electronic document 126.

In this illustrative example, user 124 accesses electronic document 126 using client computer 112. The access can be performed by user 130 interacting with a browser at client computer 112. In this illustrative example, the browser is a software application for accessing information on network data processing system 100. For example, the browser can retrieve content from a server computer such as server computer 104 and display the information on client computer 112. In this illustrative example, the browser can be, for example, a web browser.

Data verification system 128 uses verified document 130 to provide visual verification of electronic data asserted in electronic document 126. For example, in one illustrative example, the visual verification of electronic data asserted in electronic document 126 enables identifying qualified personnel by verifying employment history asserted in an online profile. As a result, a service for verifying electronic data can be performed based on data verification system 128 using verified document 130 to provide visual verification of electronic data asserted in electronic document 126.

In the illustrative example in this figure, data verification system 128 parses electronic document 126 to identify one or more assertions. Data verification system 128 and then queries one or more organizations 132 for information that substantiates the assertions. Data verification system 128 can determine the veracity of the identified assertions through a comparison of electronic document 126 to the electronic records of organization 132. When the identified assertions of electronic document 126 correlate to the electronic records of organization 132, data verification system 128 can generate a verified document 130 that attests to the veracity of assertions of electronic document 126, provide visual verification of electronic data asserted in electronic document 126.

Further, because verified document 130 provides visual verification of electronic data based on actual organizational records, data verification system 128 overcomes a technical problem of verifying electronic data, including verifying unsubstantiated assertions in an electronic document. In one illustrative example, providing a visual verification of electronic data enables an organization or third-party to more quickly and easily identify qualified people when recruiting prospective employees or reassigning personnel.

Figure 2:
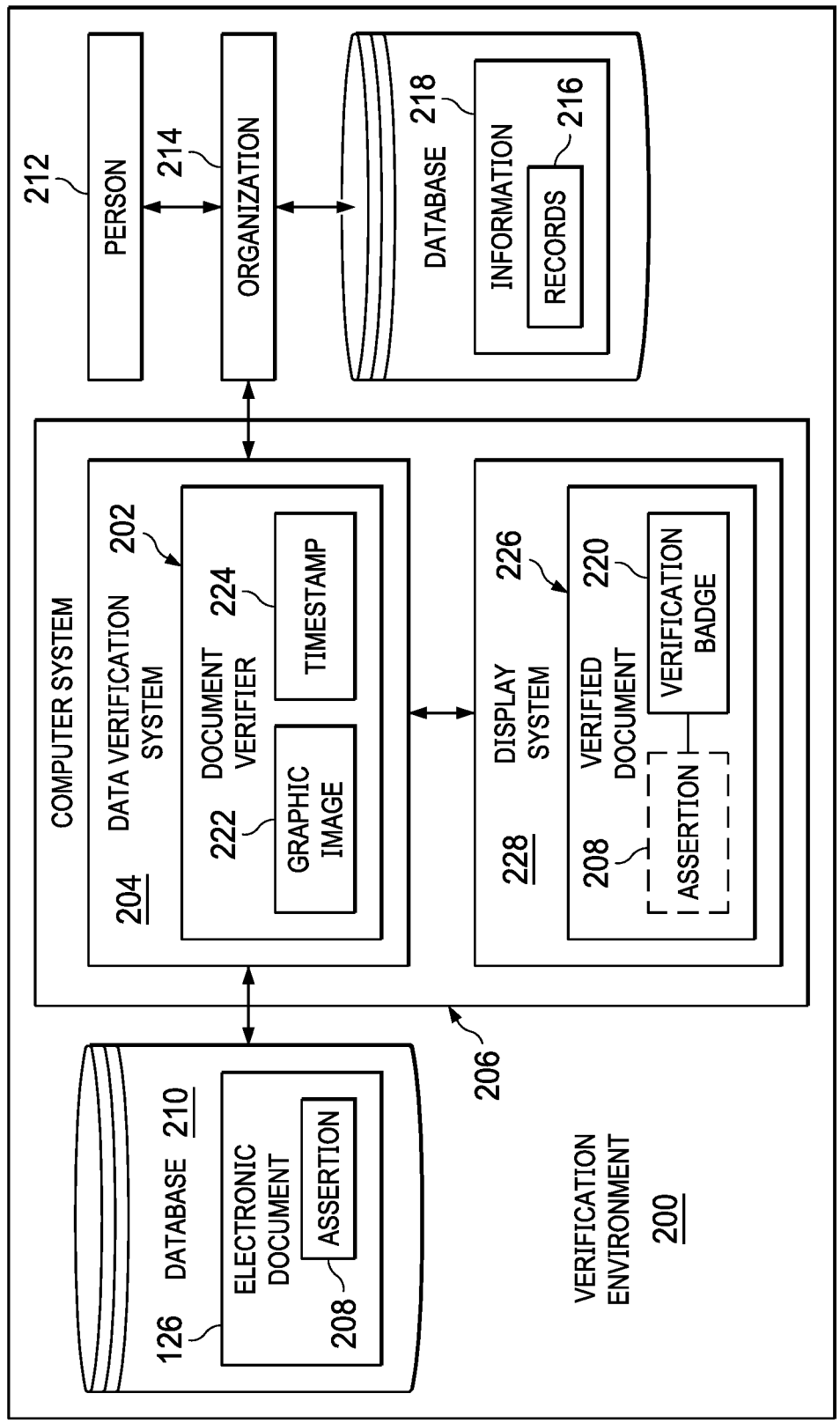
FIG. 2 is a block diagram of a verification environment in accordance with an illustrative embodiment.

With reference now to FIG. 2, a block diagram of a verification environment is depicted in accordance with an illustrative embodiment. In this illustrative example, verification environment 200 includes components that can be implemented in hardware such as the hardware shown in network data processing system 100 in FIG. 1.

As depicted, verification environment 200 is an environment in which document verifier 202 enables data verification system 204 in computer system 206 to provide services for providing visual verification of electronic document 126.

Computer system 206 is a physical hardware system and includes one or more data processing systems. When more than one data processing system is present in computer system 206, those data processing systems are in communication with each other using a communications medium. The communications medium may be a network. The data processing systems may be selected from at least one of a computer, a server computer, a tablet, or some other suitable data processing system.

In this illustrative example, document verifier 202 and computer system 206 form data verification system 204. In enabling data verification system 204 to provide services, document verifier 202 can perform identification and substantiation of assertions made in electronic documents for use in providing visual verification of electronic data by data verification system 204.

Document verifier 202 can be implemented in software, hardware, firmware, or a combination thereof. When software is used, the operations performed by document verifier 202 can be implemented in program code configured to run on hardware, such as a processor unit. When firmware is used, the operations performed by document verifier 202 can be implemented in program code and data and stored in persistent memory to run on a processor unit. When hardware is employed, the hardware may include circuits that operate to perform the operations in document verifier 202.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In this illustrative example, data verification system 128 accesses an electronic document 126. As depicted, electronic document 126 is located in database 210.

In this illustrative example, data verification system 128 parses electronic document 126 to identify assertion 208. As used herein, an assertion is a positive statement or declaration contained within electronic document 126 and presented as a factual representation. Assertion 208 can be made without support or evidence of the asserted fact.

Assertion 208 can be an assertion regarding one or more characteristics or achievements about person 212. For example, assertion 208 may be made regarding a prior job, a prior position, a current position, a current job, a current company, a prior company, a college attended, a degree obtained, or some other suitable characteristic about person 212.

In this illustrative example, data verification system 128 identifies organization 214. Data verification system 128 may identify organization 214 in association with parsing of electronic document 126. In one illustrative example, when assertion 208 references organization 214, data verification system 128 determines that assertion 208 is associated with organization 214.

Organization 214 is an organization that maintains records 216. Records 216 are information 218 that can substantiate assertion 208. Organization 214 may be, for example, an employer, a school and/or university, professional organization, a payroll services provider, and other organizations that maintain records about their members, alumni, affiliates, or service clients. The records may include a work history of the individuals, degrees conferred, documents, qualifications, transcripts, professional licenses, compensation records, and other records of the individuals, such as person 212.

In this illustrative example, data verification system 128 sending a request to organization 214 for information 218 about person 212. For example, document verifier 202 determines that assertion 208 is associated with organization 214, data verification system 128 requests records 216 from organization 214.

Data verification system 128 may access a listing or registry of organizations mapped to one or more associated APIs for retrieving records of the organization. Data verification system 128 sends the request based on the mapping.

In response to receiving the request, organization 214 performs a search of information 218, including records 216. If a search of information 218 returns records 216 that are relevant to person 212, organization 214 replies to the request, returns the requested records 216 to data verification system 128.

In this illustrative example, data verification system 128 generating a verification badge 220 in response to receiving a reply that substantiates the assertion. Verification badge 220 is a visual attestation as to the veracity of electronic data in electronic document 126.

Data verification system 128 generates verification badge 220 at an assertion-level granularity. In this manner, each assertion within electronic document can be individually verified and visually presented with a separate verification badge, generated within the context of the verifying organization.

In this illustrative example, data verification system 128 generates verification badge 220 in the context of organization 214. For example, data verification system 128 can generate verification badge including graphic image 222. Graphic image 222 is an image that is associated with, or uniquely identifies organization. Graphic image can be, for example, a trademark, service mark, logo, or stylized image that is associated with, or can uniquely identify organization. In this manner, a user can quickly determine the organizational entity maintaining the information 218 that is relied upon to substantiate the assertion 208.

In this illustrative example, data verification system 128 transforms the electronic document 126 such that the verification badge 220 is displayed association with the assertion 208. For example, data verification system 204 can alter one or more of a document object model (DOM) and a cascading style sheet (CSS) created from one or more Javascript object notation (JSON) objects or hypertext markup language (HTML) objects accessed to display electronic document 126. In this illustrative example, the DOM or CSS is transformed to include a reference the graphic image 222.

In one illustrative embodiment, document verifier 202 dynamically generates verification badge 220 when electronic document 126 is accessed. In this illustrative example, document verifier 202 can therefore generate verification badge 220 that includes timestamp 224. Timestamp 224 is a sequence of characters or encoded information that identifies a time at which verification badge 220 is created by document verifier 202. In an illustrative embodiment, timestamp 162 indicates a date and time of day of verification badge 220 creation.

In this illustrative example, data verification system 128 forms verified document 226 by displaying the verification badge 220 in association with the assertion 208. By displaying verified document 226 that includes verification badge 220, verified document 226 provides a first level of verification as to the truthfulness of assertion 208 and electronic document 126. In this manner, verified document 226 provides visual verification of electronic data asserted in electronic documents based on its substantiation against records 216 maintained by organization 214.

Data verification system 204 can display verified document 226 within a graphical user interface displayed on display system 228. Display system 228 can include one or more display devices, selected from one of a liquid crystal display (LCD), a light emitting diode (LED) display, an organic light emitting diode (OLED) display, and other suitable types of display devices.

Document verifier 202 uses verification badge 220 to provide visual verification of electronic data asserted in electronic document 126. In one illustrative example, the visual verification of electronic data asserted in electronic document 126 enables identifying qualified personnel by verifying employment history asserted in an online resume or profile. As a result, a service for verifying electronic document 126 can be performed based on document verifier 202 using verification badge 220 to provide visual verification of characteristics or achievements of person 212 asserted in electronic document 126.

Further, because verified document 226 provides visual verification of electronic data based on actual records 216 maintained by organization 214, verification system 200 for that includes document verifier 202 overcomes a technical problem of verifying electronic data, including verifying unsubstantiated assertions in an electronic document. In one illustrative example, providing a visual verification of electronic data enables an organization or third-party to more quickly and easily identify qualified people when recruiting prospective employees or reassigning personnel.

Figure 3:
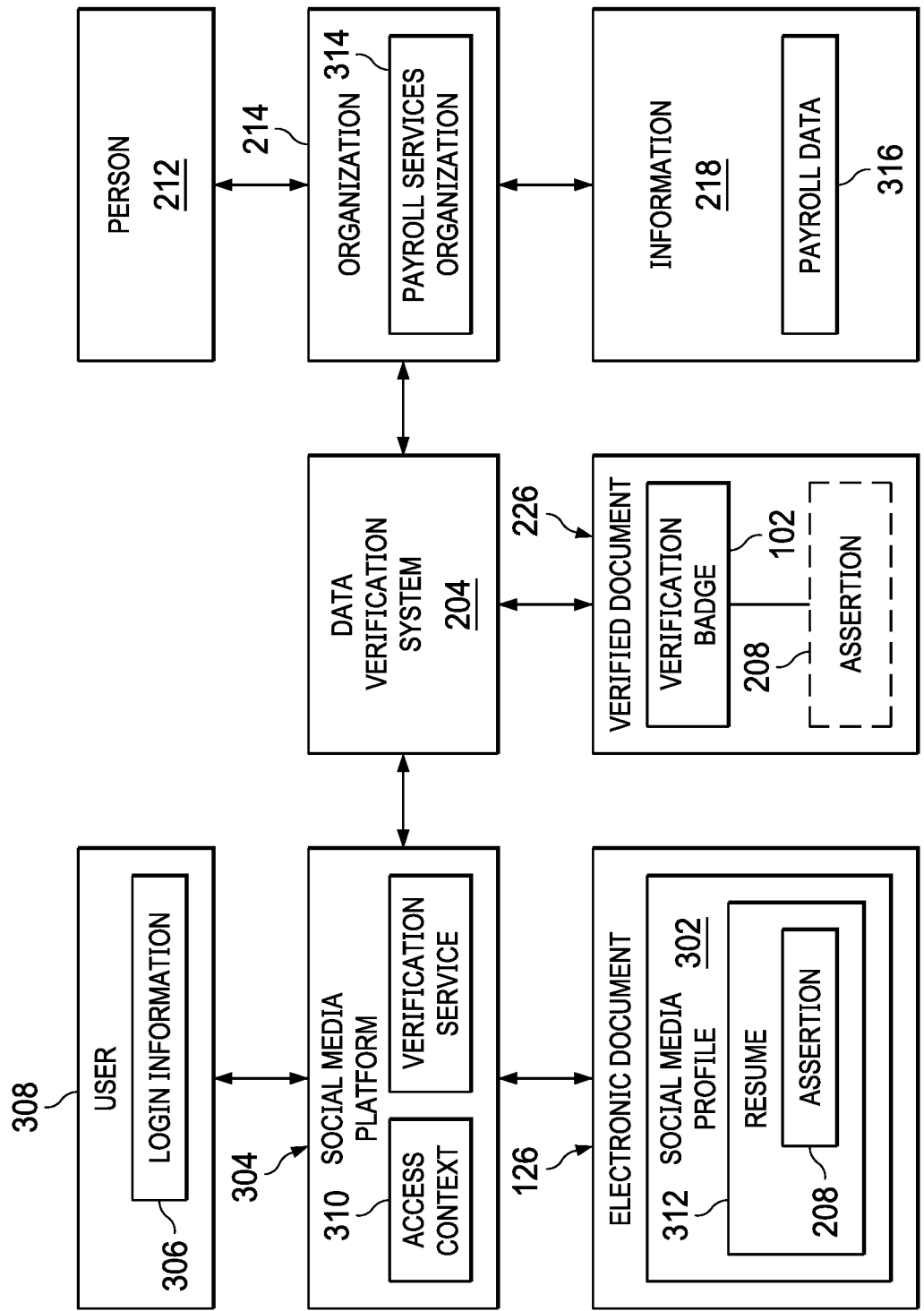
FIG. 3 is a data flow diagram illustrating data flow used to access an electronic document in the context of a social media platform in accordance with an illustrative embodiment.

With reference next to FIG. 3, a data flow diagram illustrating data flow used to access an electronic document in the context of a social media platform is depicted in accordance with an illustrative embodiment. In the illustrative examples, the same reference numeral may be used in more than one figure. This reuse of a reference numeral in different figures represents the same element in the different figures.

In this illustrative example, the electronic document 126 is social media profile 302 of person 212.

As used herein, social media platform 304 is a platform, including websites and online services, that facilitate communication with an online community of people who use the websites or online service to communicate with each other and share information and resources. For example, database 210 can store user profiles for an online social network such as at least one of LinkedIn, Facebook, or other social networking websites. Social media platform 304 can also include job posting boards or career building sites that allow the community to view available employment positions posted by employer, and to express interest in or apply for those employment position.

In one illustrative example, electronic document 126 can be social media profile 302 for person 212 on social media platform 304. data verification system 204 can access electronic document 126 by receiving social media profile 302 from social media platform 304.

In one illustrative example, social media platform 304 receives login information 306 from user 308. Login information 306 is one or more authorization attributes, such as usernames, passwords, and other access credentials that uniquely identify user 308 within the context of social media platform 304. User 308 provides login information 306 To access a social media platform 304.

Login information 306 creates an access context 310 in which user 308 can access electronic document 126. Once authenticated, user 308 accesses the social media profile 302 according to the access context 310.

In one illustrative example, data verification system 204 requests information 218 within access context 310 of user 308 to social media platform 304. By sending the request within the access context 310 of user 308, data verification system 204 enables verification of assertion 208 to be performed as verification service 318. Because information 218 is requested within the access context 310 of user 308, one or more of data verification system 204 or organization 214 may limit access to information 218 according to access context 310. For example, data verification system 204 may permit access to information 218 when user 308 has a valid subscription to verification service 318. In this manner, organization 214 searches information 218 in response to a determination that user 308 is permitted to access a database containing information 218.

In one illustrative example, social media profile 302 comprises resume 312 for person 212. When social media profile 302 includes resume 312, assertion 208 can be selected from one of a prior job of person 212, a prior position of person 212, a current position of person 212, a current job of person 212, a current company that employs person 212, a prior company that employed person 212, a college attended by person 212, and a degree obtained by person 212, as well as other relevant assertions.

In one illustrative example, organization 214 comprises payroll services organization 314. payroll services organization 314 provides human resources management services including, for example, an employee benefits service, a compliance service, a timekeeping service, a retirement planning service, as well as other human resources services including tax compliance, organization structure, recruitment, training, and other suitable functions relating to the management of employees.

When organization 214 is payroll services organization 314, information 218 about the person 212 can include payroll data 316. Payroll data 316 is data generated by payroll services organization 314 in providing employment services to an employer of person 212. Payroll data 316 can include, for example, a salary paid to an employee by an employer, a wage paid to the employee by the employer, a bonus paid to the employee by the employer, and a tax deduction to the employer based on the employment of the employee.

In one illustrative example, one or more technical solutions are present that overcome a technical problem of verifying electronic data, including verifying unsubstantiated assertions in social media profile 302. As a result, one or more technical solutions can provide a technical effect of provides visual verification of social media profile 302 based on payroll data 316 maintained by payroll services organization 314 as compared to current techniques. Providing a visual verification of assertion 208 in resume 312 posted in social media profile 302 enables user 308 to more quickly and reliably identify the qualifications of person 212 based on payroll data 316.

In this manner, computer system 206 of FIG. 2 can be configured to perform at least one of the steps, operations, or actions described in the different illustrative examples using software, hardware, firmware, or a combination thereof. As a result, computer system 206 operates as a special purpose computer system in which document verifier 202 in computer system 206 enables the visual verification of electronic data. In particular, document verifier 202 transforms computer system 206 into a special purpose computer system as compared to currently available general computer systems that do not have document verifier 202.

In the illustrative example, the use of document verifier 202 in computer system 206 integrates processes into a practical application for providing visual verification of electronic data in a manner that increases the performance of computer system 206.

In other words, document verifier 202 in computer system 206 is directed to a practical application of processes integrated into document verifier 202 in computer system 206 that provides visual verification of asserted facts substantiated by records maintained by an independent party. As a result, electronic documents can be transformed for use in providing visual verification of asserted facts as services provided to various users.

The illustration of verification environment 200 in FIGS. 2-3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
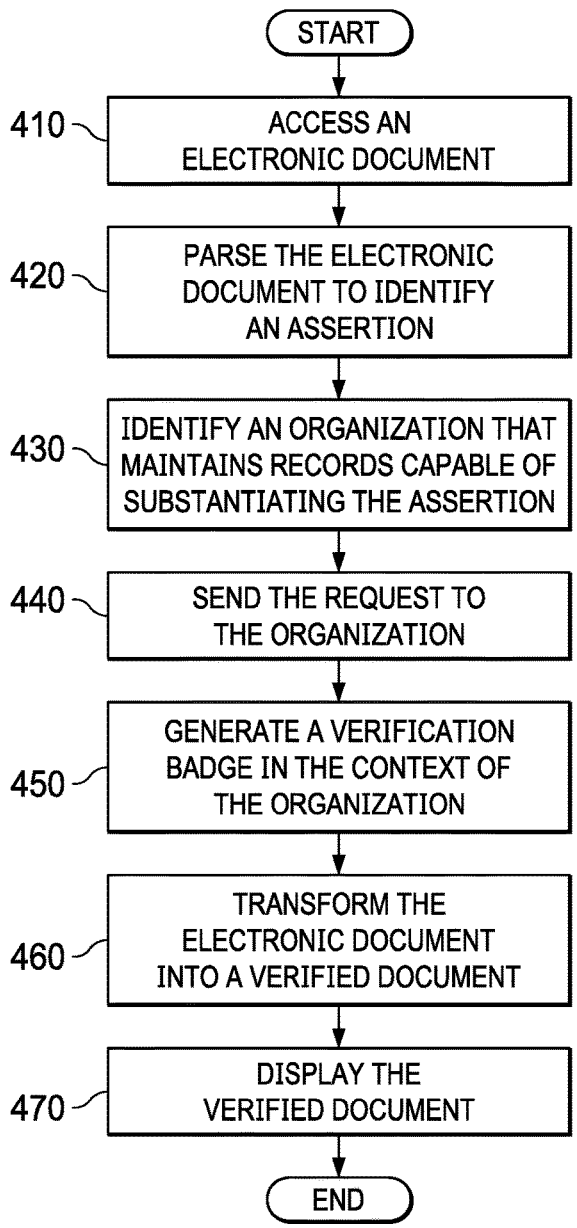
FIG. 4 is a flowchart of a process for providing visual verification of electronic data in accordance with an illustrative embodiment.

Turning next to FIG. 4, a flowchart of a process for providing visual verification of electronic data is depicted in accordance with an illustrative embodiment. The process in FIG. 4 can be implemented in hardware, software, or both. When implemented in software, the process can take the form of program code that is run by one or more processor units located in one or more hardware devices in one or more computer systems. For example, the process can be implemented in document verifier 202 in computer system 206 in FIG. 2.

The process begins by accessing an electronic document (step 410). The process parses the electronic document to identify an assertion about a person (step 420). The assertion can be, for example, an assertion about a characteristic or achievement of a person, such as assertion 208 of FIG. 2.

The process identifies an organization that maintains records capable of substantiating the assertion (step 430). The organization can be identified in response to, or in conjunction with, identifying the assertion. The process sends a request to the organization (step 440). The request can be for information that substantiates the assertion about the person.

Sometime thereafter, the process may receive a reply from the organization. The process generates a verification badge in the context of the organization (step 450). The verification badge can be generated in response to receiving a reply that substantiates the assertion.

The process transforms the electronic document by associating the verification badge with the assertion to create a verified document (step 460). The process then displays the verified document (step 470). The verified document displays the verification badge in association with the assertion. The process terminates thereafter.

Figure 5:
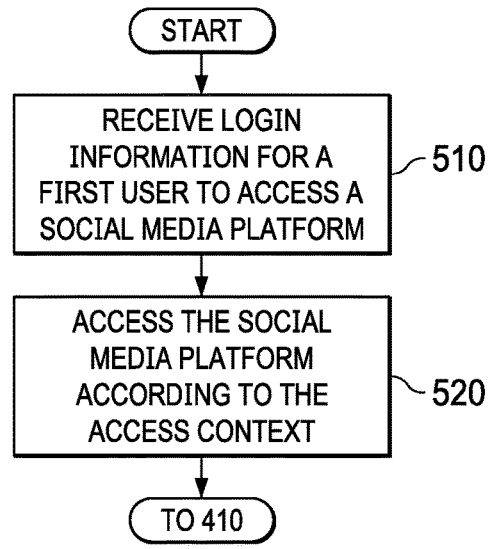
FIG. 5 is a flowchart of a process for accessing an electronic document in the context of a social media platform in accordance with an illustrative embodiment.

Turning next to FIG. 5, a flowchart of a process for access electronic document in the context of a social media platform is depicted in accordance with an illustrative embodiment. The process in FIG. 5 is an example of one manner in the process of FIG. 4 can be implemented in the context of a social media platform.

The process begins by receiving login information for a first user to access a social media platform (step 510). The login information is one or more authorization attributes, such as usernames, passwords, and other access credentials that uniquely identify the user within the context of social media platform. The login information creates an access context in which the first user can access the electronic document.

In one illustrative example, the social media profile comprises a resume for the person. within the resume, an assertion about the person can be, for example, a prior job, a prior position, a current position, a current job, a current company, a prior company, a college attended, and a degree obtained.

In one illustrative example, the organization is a payroll services organization. Information about the person can be payroll data of employment services data generated by the payroll services organization. The payroll data can be selected from the group consisting of a salary paid to an employee by an employer, a wage paid to the employee by the employer, a bonus paid to the employee by the employer, and a tax deduction to the employer based on the employment of the employee.

The process accesses the social media profile according to the access context (step 520), and thereafter proceeds to step 410 of FIG. 4.

Figure 6:
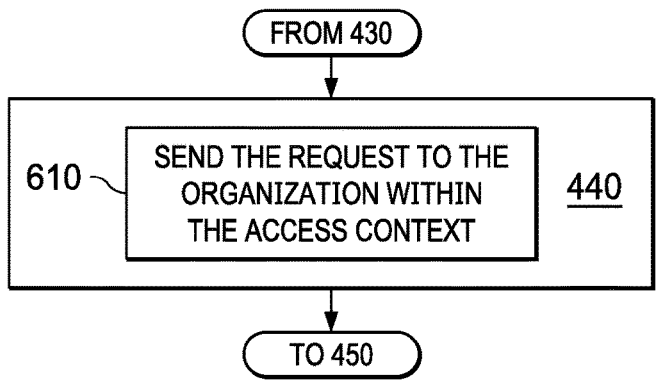
FIG. 6 is a flowchart of a process for sending a verification request in accordance with an illustrative embodiment.

Turning next to FIG. 6, a flowchart of a process for sending a verification request is depicted in accordance with an illustrative embodiment. The process in FIG. 6 is an example of one manner in which step 440 in FIG. 4 can be implemented.

Continuing from step 430 of FIG. 4, the process sends the request to the organization within the access context (step 610). The organization searches the database in response to determining that the first user is permitted to access the database. In this manner, the process enables a subscription service through which electronic documents can be verified based on information generated by the organization. Thereafter, the organization can return reply, and the process proceeds to step 450 of FIG. 4.

Figure 7:
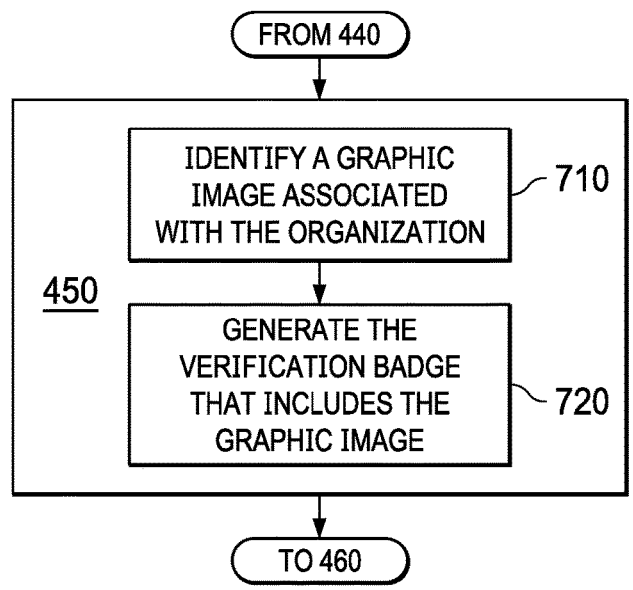
FIG. 7 is a flowchart of a process for generating the verification badge in the context of the organization in accordance with an illustrative embodiment.

Turning next to FIG. 7, a flowchart of a process for generating the verification badge in the context of the organization is depicted in accordance with an illustrative embodiment. The process in FIG. 7 is an example of one manner in which step 450 in FIG. 4 can be implemented.

Continuing from step 440, the process identifies a graphic image that is associated with the organization (step 710). The graphic image can be, for example, graphic image 222 of FIG. 2. The process generates a verification badge that includes the graphic image (step 720), and thereafter proceeds to step 460 of FIG. 4.

Figure 8:
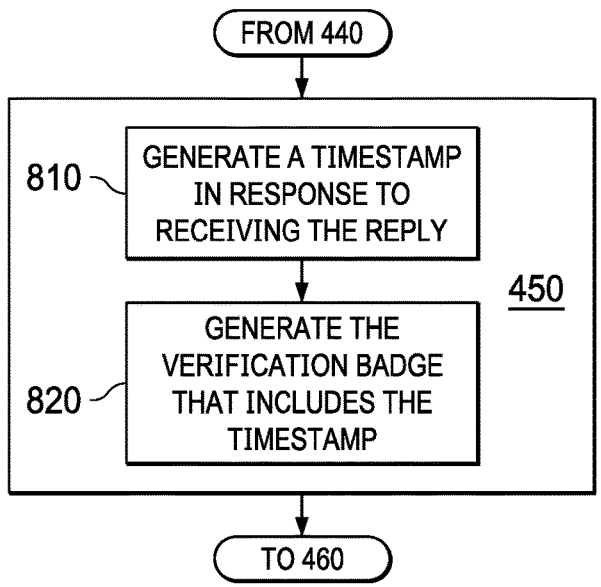
FIG. 8 is a flowchart of another process for generating the verification badge in the context of the organization in accordance with an illustrative embodiment.

Turning next to FIG. 8, a flowchart of another process for generating the verification badge in the context of the organization is depicted in accordance with an illustrative embodiment. The process in FIG. 8 is an example of one manner in which step 450 in FIG. 4 can be implemented.

Continuing from step 440, the process generates generating a time stamp in response to receiving a reply (step 810). The reply can include information that substantiates the assertion. The process generates the verification badge that includes the time stamp (step 820), and thereafter proceeds to step 460 of FIG. 4.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
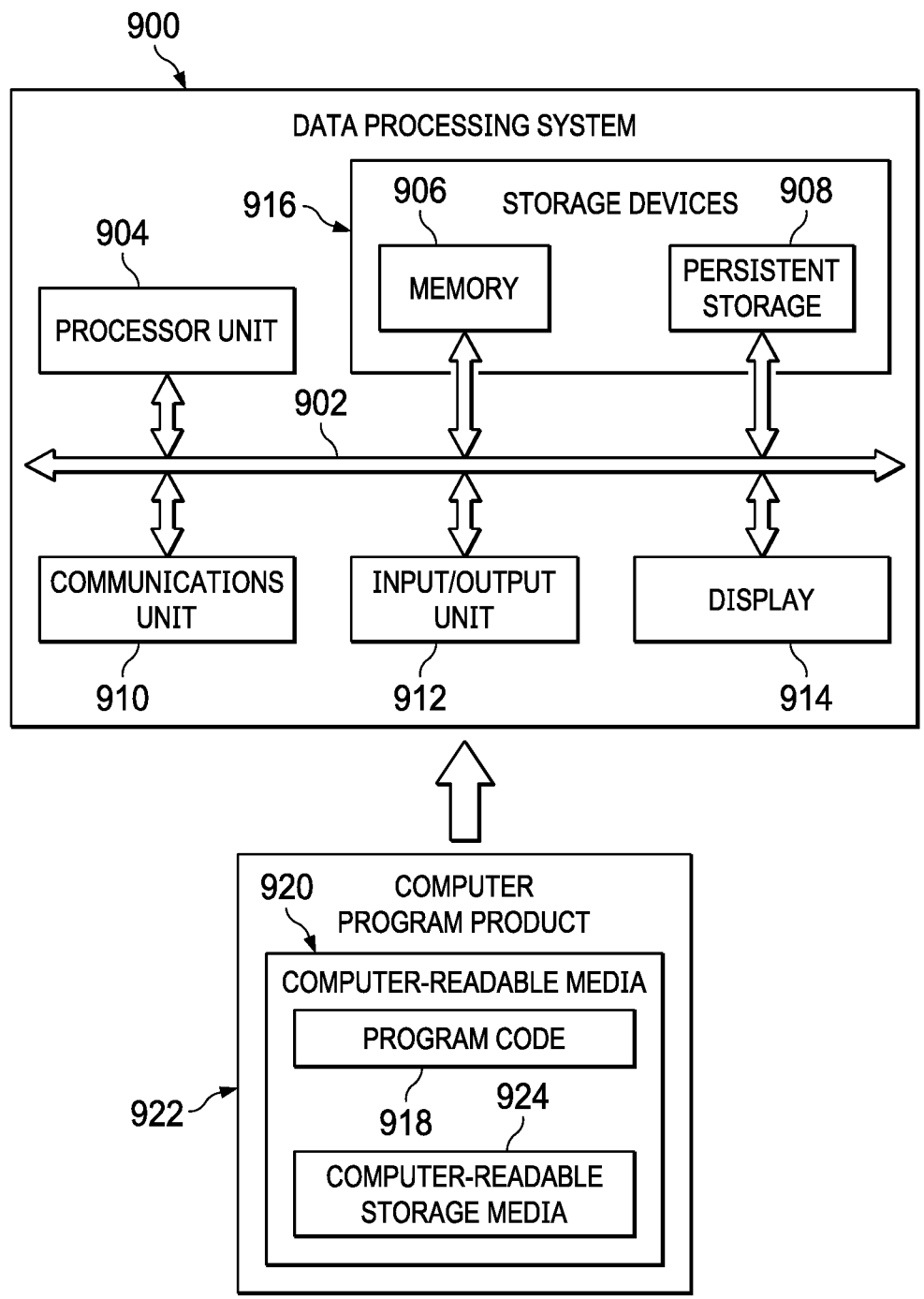
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement server computer 104, server computer 106, client devices 110, in FIG. 1. Data processing system 900 can also be used to implement computer system 206 in FIG. 2.

In this illustrative example, data processing system 900 includes communications framework 902, which provides communications between processor unit 904, memory 906, persistent storage 908, communications unit 910, input/output (I/O) unit 912 and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are referred to as program code, computer usable program code, or computer-readable program code that can be read and executed by a processor in processor unit 904. The program code in the different embodiments can be embodied on different physical or computer-readable storage media, such as memory 906 or persistent storage 908.

Program code 918 is located in a functional form on computer-readable media 920 that is selectively removable and can be loaded onto or transferred to data processing system 900 for execution by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918. The term "non-transitory" or "tangible", as used herein, is a limitation of the medium itself (i.e., tangible, not a signal) as opposed to a limitation on data storage persistency (e.g., RAM vs. ROM).

Alternatively, program code 918 can be transferred to data processing system 900 using a computer-readable signal media. The computer-readable signal media can be, for example, a propagated data signal containing program code 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media" can be singular or plural. For example, program code 918 can be located in computer-readable media 920 in the form of a single storage device or system. In another example, program code 918 can be located in computer-readable media 920 that is distributed in multiple data processing systems. In other words, some instructions in program code 918 can be located in one data processing system while other instructions in program code 918 can be located in one data processing system. For example, a portion of program code 918 can be located in computer-readable media 920 in a server computer while another portion of program code 918 can be located in computer-readable media 920 located in a set of client computers.

The different components illustrated for data processing system 900 are not meant to provide architectural limitations to the manner in which different embodiments can be implemented. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program code 918.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, memory 906, or portions thereof, may be incorporated in processor unit 904 in some illustrative examples.

Thus, illustrative embodiments by method, apparatus, system, and computer program product for providing visual verification of electronic data. In one illustrative example, accesses an electronic document. The computer system parses the electronic document to identify an assertion about a person. The computer system identifies an organization that maintains records capable of sustaining the assertion. The computer system sends a request to the organization to search for information about the person that substantiates the assertion. In response to receiving a reply that substantiates the assertion, the computer system generates a verification badge in the context of the organization. The computer system transforms the electronic document to display a verified document that associates the verification badge with the assertion. The computer system displays the verified document, including the verification badge in association with the assertion. This method can be implemented in the illustrative example described for FIG. 2 in which document verifier 202 operates to identify and substantiate assertion 208 in electronic document 126.

Thus, in the illustrative examples, document verifier 202 uses verification badge 220 to provide visual verification of electronic data asserted in electronic document 126. In one illustrative example, the visual verification of electronic data asserted in electronic document 126 enables identifying qualified personnel by verifying employment history asserted in an online resume or profile. As a result, a service for verifying electronic document 126 can be performed based on document verifier 202 using verification badge 220 to provide visual verification of characteristics or achievements of person 212 asserted in electronic document 126.

Further, because verified document 226 provides visual verification of electronic data based on actual records 216 maintained by organization 214, verification system 200 for that includes document verifier 202 overcomes a technical problem of verifying electronic data, including verifying unsubstantiated assertions in an electronic document. In one illustrative example, providing a visual verification of electronic data enables an organization or third-party to more quickly and easily identify qualified people when recruiting prospective employees or reassigning personnel.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for providing visual verification of electronic data, the method comprising:

accessing, by one or more processing circuits, an electronic document associated with a first device;

parsing, by the one or more processing circuits, the electronic document to identify an assertion included in the electronic document;

identifying, by the one or more processing circuits, an organization that maintains records capable of substantiating the assertion, wherein the organization comprises an independent third-party;

creating, by the one or more processing circuits responsive to receiving login information from the first device, an access context to restrict access to information that verifies the assertion, the login information associated with the organization capable of substantiating the assertion;

generating, by the one or more processing circuits, a request with the access context that is configured to grant the organization with authorization to retrieve information that verifies the assertion;

sending, by the one or more processing circuits to the organization, the request to search for the information that verifies the assertion, the request including the access context used to obtain authorization to retrieve the information that verifies the assertion;

in response to receiving a reply that substantiates the assertion, generating, by the one or more processing circuits, a verification badge in a context of the organization, wherein generating the verification badge in the context of the organization includes identifying a graphic image associated with the organization for inclusion in the verification badge;

transforming, by the one or more processing circuits, the electronic document to display the verification badge in association with the assertion and the graphic image associated with the organization, wherein transforming the electronic document comprises altering a document object model and a cascading style sheet accessed to display the electronic document; and displaying, by the one or more processing circuits, the transformed electronic document within a graphical user interface, the transformed electronic document including the verification badge in association with the assertion and the graphic image associated with the organization.

2. The method of claim 1, wherein the electronic document is a social media profile, the method further comprising:

receiving, by the one or more processing circuits, login information to access a social media platform, wherein the login information creates a second access context to access the electronic document; and accessing, by the one or more processing circuits, the social media profile according to the second access context.

3. The method of claim 2, wherein the social media profile comprises a resume, and wherein the assertion is selected from one of a prior job, a prior position, a current position, a current job, a current company, a prior company, a college attended, and a degree obtained.

4. The method of claim 2, wherein the records maintained by the organization comprise payroll data of employment services data selected from a group consisting of a salary paid to an employee by an employer, a wage paid to the employee by the employer, a bonus paid to the employee by the employer, and tax deductions to the employer based on employment of the employee.

5. The method of claim 2, further comprising:

sending, by the one or more processing circuits, the request to the organization within the access context, wherein the organization searches a database in response to determining that the access context provides access to the database.

6. The method of claim 1, wherein generating the verification badge in the context of the organization comprises:

generating, by the one or more processing circuits, the verification badge to include the graphic image.

7. The method of claim 1, wherein generating the verification badge in the context of the organization comprises:

generating, by the one or more processing circuits, a time stamp in response to receiving a reply that substantiates the assertion; and generating, by the one or more processing circuits, the verification badge to include the time stamp.

8. A data verification system comprising:
a computer system; and
a document verifier in the computer system, wherein the document verifier operates to:
  access an electronic document associated with a first device;
  parse the electronic document to identify an assertion included in the electronic document;
  identify an organization that maintains records capable of substantiating the assertion, wherein the organization comprises an independent third-party;
  create, responsive to receiving login information from the first device, an access context to restrict access to information that verifies the assertion, the login information associated with the organization capable of substantiating the assertion;
  generate a request with the access context that is configured to grant the organization with authorization to retrieve information that verifies the assertion;
  send, to the organization, the request to search for the information that verifies the assertion, the request including the access context used to obtain authorization to retrieve the information that verifies the assertion;
  in response to receiving a reply that substantiates the assertion, generate a verification badge in a context of the organization, wherein generating the verification badge in the context of the organization includes identifying a graphic image associated with the organization for inclusion in the verification badge;
  transform the electronic document to display the verification badge in association with the assertion and the graphic image associated with the organization, wherein transforming the electronic document comprises altering a document object model and a cascading style sheet accessed to display the electronic document; and
  display the transformed electronic document within a graphical user interface, the transformed electronic document including the verification badge in association with the assertion and the graphic image associated with the organization.

9. The data verification system of claim 8, wherein the electronic document is a social media profile, wherein the document verifier further operates to:
  receive login information to access a social media platform, wherein the login information creates a second access context to access the electronic document; and
  access the social media profile according to the second access context.

10. The data verification system of claim 9, wherein the social media profile comprises a resume, and wherein the assertion is selected from one of a prior job, a prior position, a current position, a current job, a current company, a prior company, a college attended, and a degree obtained.

11. The data verification system of claim 9, wherein the records maintained by the organization comprise payroll data of employment services data selected from a group consisting of a salary paid to an employee by an employer, a wage paid to the employee by the employer, a bonus paid to the employee by the employer, and tax deductions to the employer based on employment of the employee.

12. The data verification system of claim 9, wherein the document verifier further operates to:
  send the request to the organization within the access context, wherein the organization searches a database in response to determining that the access context provides access to the database.

13. The data verification system of claim 8, wherein the document verifier further operates to:
  generate the verification badge to include the graphic image.

14. The data verification system of claim 8, wherein the document verifier further operates to:
  generate a time stamp in response to receiving a reply that substantiates the assertion; and
  generate a verification badge that includes the time stamp.

15. A computer program product for providing visual verification of electronic data, the computer program product comprising:
  a computer readable storage media;
  program code, stored on the computer readable storage media, for accessing an electronic document associated with a first device;
  program code, stored on the computer readable storage media, for parsing the electronic document to identify an assertion included in the electronic document;
  program code, stored on the computer readable storage media, for identifying an organization that maintains records capable of substantiating the assertion, wherein the organization comprises an independent third-party;
  program code, stored on the computer readable storage media, for creating, responsive to receiving login information from the first device, an access context to restrict access to information that verifies the assertion, the login information associated with the organization capable of substantiating the assertion;
  program code, stored on the computer readable storage media, for generating a request with the access context that is configured to grant the organization with authorization to retrieve information that verifies the assertion;
  program code, stored on the computer readable storage media, for sending, to the organization, the request to search for the information that verifies the assertion, the request including the access context used to obtain authorization to retrieve the information that verifies the assertion;
  program code, stored on the computer readable storage media, for generating a verification badge in a context of the organization in response to receiving a reply that substantiates the assertion, wherein generating the verification badge in the context of the organization includes identifying a graphic image associated with the organization for inclusion in the verification badge;
  program code, stored on the computer readable storage media, for transforming the electronic document to display the verification badge in association with the assertion and the graphic image associated with the organization, wherein transforming the electronic document comprises altering a document object model and a cascading style sheet accessed to display the electronic document; and
  program code, stored on the computer readable storage media, for displaying the transformed electronic document within a graphical user interface, the transformed electronic document including the verification badge in association with the assertion and the graphic image associated with the organization.

16. The computer program product of claim 15, wherein the electronic document is a social media profile, the computer program product further comprising:
- program code, stored on the computer readable storage media, for receiving login information to access a social media platform, wherein the login information creates a second access context to access the electronic document; and
- program code, stored on the computer readable storage media, for accessing the social media profile according to the second access context.

17. The computer program product of claim 16, wherein the social media profile comprises a resume, and wherein the assertion is selected from one of a prior job, a prior position, a current position, a current job, a current company, a prior company, a college attended, and a degree obtained.

18. The computer program product of claim 16, wherein the records maintained by the organization comprise payroll data of employment services data selected from a group consisting of a salary paid to an employee by an employer, a wage paid to the employee by the employer, a bonus paid to the employee by the employer, and tax deductions to the employer based on employment of the employee.

19. The computer program product of claim 16, further comprising: program code, stored on the computer readable storage media, for sending the request to the organization within the access context, wherein the organization searches a database in response to determining that the access context provides access to the database.

20. The computer program product of claim 15, wherein the program code for generating the verification badge in the context of the organization comprises:
- program code for generating the verification badge to include the graphic image.

\* \* \* \* \*